United States Patent [19]

DuMez

[11] 4,258,474

[45] Mar. 31, 1981

[54] METHOD AND APPARATUS FOR AIDING MEASUREMENT OF PREFORMED TUBES

[75] Inventor: Frank M. DuMez, Glen Ellyn, Ill.

[73] Assignee: Teledyne Industries, Inc., Aurora, Ill.

[21] Appl. No.: 87,582

[22] Filed: Oct. 22, 1979

[51] Int. Cl.³ .............................................. G01B 7/28
[52] U.S. Cl. .............................. 33/174 P; 33/174 L; 33/174 N
[58] Field of Search ............... 33/174 L, 174 P, 1 M, 33/174 N, 178 E

[56] References Cited

U.S. PATENT DOCUMENTS

| | | | |
|---|---|---|---|
| 2,462,121 | 2/1949 | Muhlack | 33/174 N |
| 2,464,444 | 3/1949 | Gantz | 33/174 N |
| 2,713,725 | 7/1955 | Goldsmith | 33/174 G |
| 3,211,446 | 10/1965 | Headrick | 33/174 N |
| 4,122,607 | 10/1978 | Hopf | 33/174 L |
| 4,122,608 | 10/1978 | Hopf | 33/174 L |

*Primary Examiner*—Willis Little

*Attorney, Agent, or Firm*—Wegner, Stellman, McCord, Wiles & Wood

[57] ABSTRACT

A method of measuring the bends in a preformed tube by locating in space, with a mechanical tube-engaging apparatus, the centerline of each straight tube section. Where the bends are measured of a tube which is longer than the physical boundaries of the apparatus, adjacent portions of the tube are successively positioned within the boundaries of the apparatus and the centerlines of sufficient straight tube sections are located with the tube in successive positions to correlate the tube position and orientation at the successive tube positions. In measuring a tube with a straight section of such a length that bends at either end thereof cannot be correlated at successive tube positions within the physical boundaries of said apparatus, an apparatus is attached to the straight section of the tube to create simulated bends within the long straight section, enabling measurement of the bends at each end of the long straight section.

6 Claims, 3 Drawing Figures

U.S. Patent  Mar. 31, 1981  4,258,474
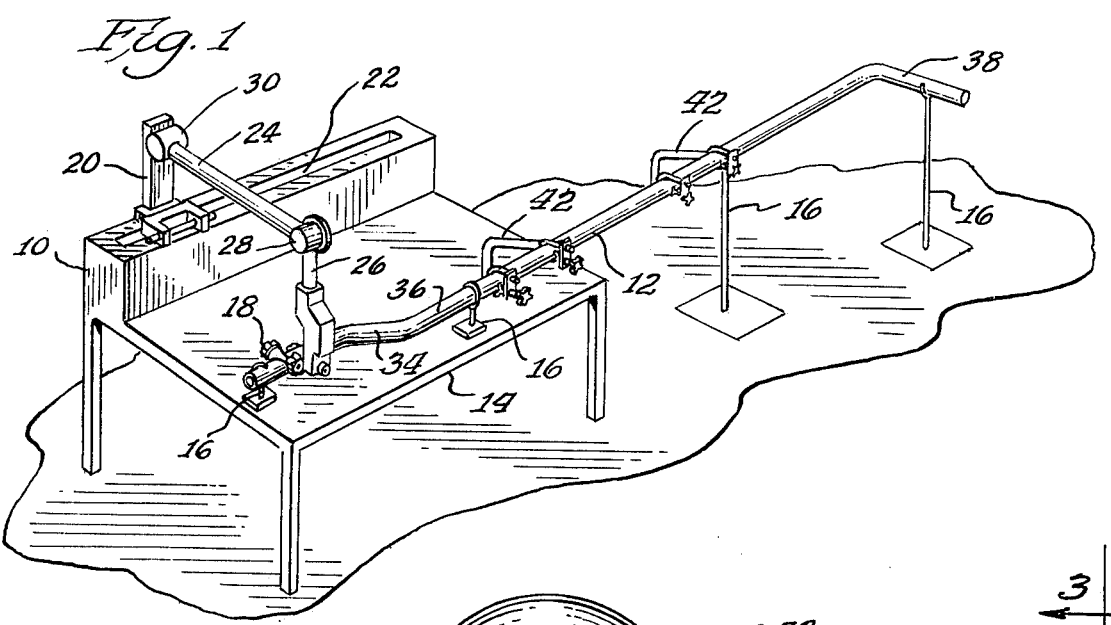
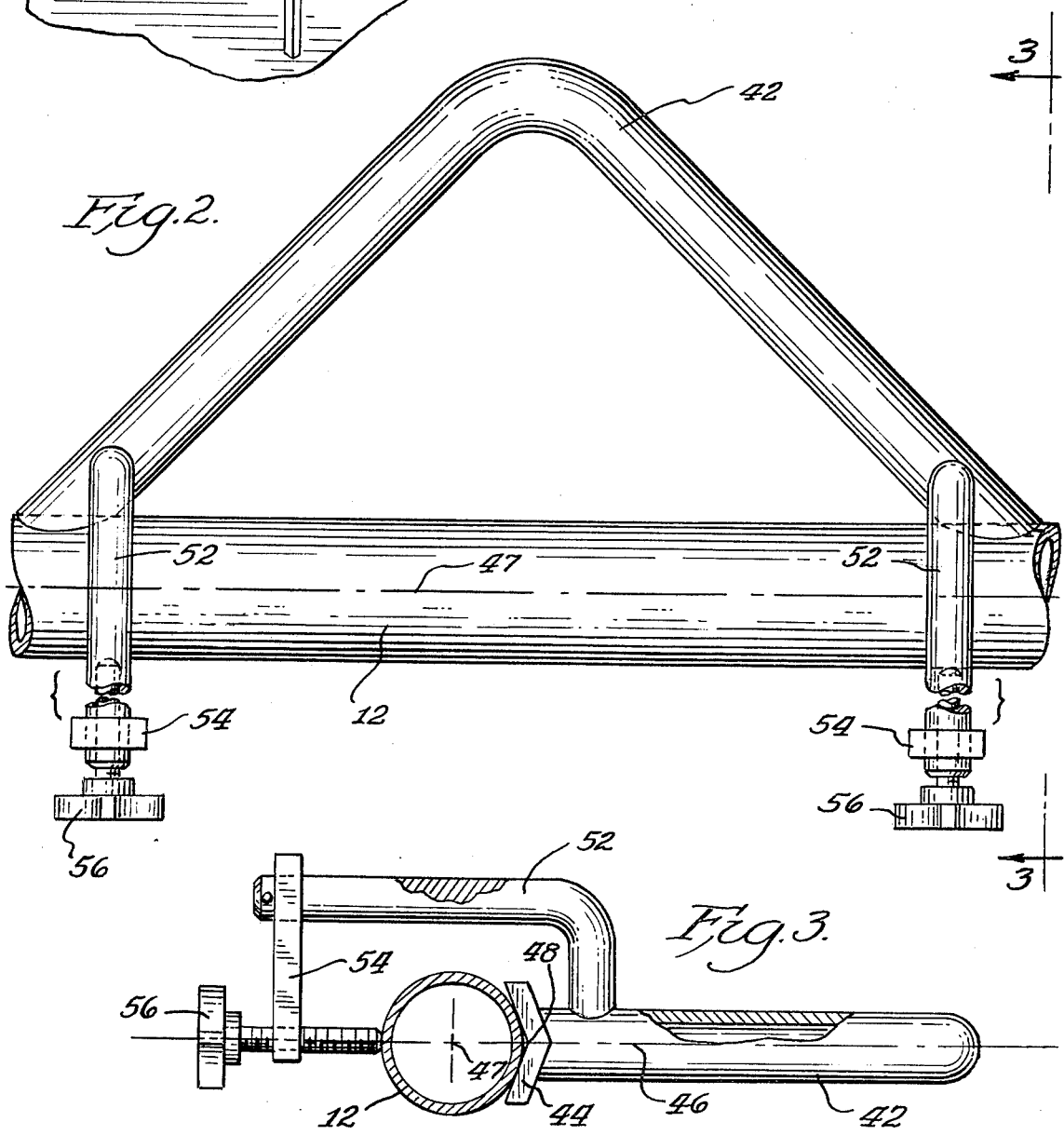

METHOD AND APPARATUS FOR AIDING MEASUREMENT OF PREFORMED TUBES

BACKGROUND OF THE INVENTION

Measurement of preformed tubes are taken to enable reproduction of such tube configurations. Hopf U.S. Pat. No. 4,122,607, issued Oct. 31, 1978, discloses an instrument for taking such measurements. The tube is fixed onto the instrument table and is measured by engaging a metered mechanical apparatus at points along the straight portions of the tube to define the centerlines of the straight portions. Using this data, the tube configuration may be computed.

When a tube is so long as to extend beyond the boundaries of the instrument, the tube is measured in sections. The tube is shifted so that at least two measured straight sections remain within the instrument boundaries. Those two straight sections are relocated with the instrument and then the remaining straight sections of the tube within the instrument boundaries are also located. These later measured sections can in this way be spatially correlated to the first measured sections of the tube.

A problem has arisen when the tube has a straight section which is so long that it is impossible to spatially locate straight sections defining successive bends within the boundaries of the instrument. I have developed both a method and an apparatus for creating false bends within the long straight section so as to overcome this problem.

SUMMARY OF THE INVENTION

A tube element with straight sections defining a bend is attached to the long straight portion of the tube. This bent tube element is at each end attached to the long straight section so that the plane of its centerline is in the same plane as the centerline of the long straight section. The spatial coordinates of this bent tube element are measured as if the straight portion had actually contained three bends. The preformed tube being measured may then be shifted on the instrument to measure the remaining portions of the preformed tube. The only measured sections of the tube which need remain within the instrument boundaries in order to correlate each end of the tube with the other are those sections which were measured in the simulated bends. If the tube is extremely long, it may be required that several such simulated bends be attached before reaching an actual bend in the tube. It is then a simple geometric calculation to use the date obtained from the simulated bends to obtain the actual measurements of the long straight portion.

DRAWINGS

FIG. 1 is a perspective view of the apparatus in use in conjunction with a measuring instrument;

FIG. 2 is a side view of the apparatus secured to a tube; and

FIG. 3 is an end view of the apparatus taken along line 3—3 of FIG. 2 showing detail of the preferred means for attaching the apparatus to the preformed tube.

DESCRIPTION OF THE PREFERRED EMBODIMENT

FIG. 1 shows an instrument 10 for taking measurements of preformed tubes of the type disclosed in Hopf U.S. Pat. No. 4,122,607 which is incorporated by reference herein. A preformed tube 12 to be measured is firmly secured on the instrument table 14. Various stands 16 are used to support the preformed tube 12 to ensure that the preformed tube 12 does not twist under its own weight.

A tube feeler 18 is engaged with the preformed tube 12 at any two points along a straight section of the preformed tube 12. A particular configuration of a tube feeler is disclosed in Hopf, U.S. Pat. No. 4,122,608 which is incorporated by reference herein. This tube feeler 18 may be moved to any location within the three-dimensional space above the instrument table 14 by movement of the vertical column 20 in the channel 22 and pivoting of arms 24 and 26 around pivots 28 and 30. A linear sensor measures movement of the vertical column 20 within the channel 22 and rotary sensors measure movements of arms 24 and 26 around pivots 28 and 30. The measurements taken by these sensors permit calculation of the location of the center-line point being measured on the preformed tube 12 within the space above the instrument table 14. Typically, these sensors transmit the data to a computer which is programmed to automatically compute the location of the preformed tube centerline.

When the preformed tube 12 is too large to be fit entirely within the range of movement of the tube feeler 18, as shown in FIG. 1, the preformed tube 12 is at one end secured on the instrument table 14 and measurements are taken of those points on the preformed tube 12 which may be reached by the tube feeler 18. Once those points are measured, the preformed tube 12 is shifted over on the instrument table 14 so that the unmeasured portions of the preformed tube 12 are on the table but making sure that at least the last two measured straight sections still remain on the instrument table 14. These two sections are then remeasured to locate them in the space above the instrument table 14. The unmeasured sections are then located by the instrument 10. The location of the two remeasured straight sections may then be used to spatially correlate the newly-measured sections of the preformed tube 12 with those originally measured.

When the preformed tube 12 has a long straight section 36 as shown in FIG. 1, it has been difficult to correlate the measurements at each end of the preformed tube 12. The directions of straight sections 34 and 36 are the sections which would have to be remeasured in order to correlate that end of the preformed tube 12 with measurement of straight section 38. Due to the length of the instrument table 14 (i.e. the boundaries of the instrument), it is impossible to measure sections 34, 36 and 38 while keeping the preformed tube 12 in a single position.

This invention uses a bent tube 42 which may be attached to the long straight section 36 of the preformed tube 12 as shown in FIG. 1. As shown in FIG. 2, the bent tube 42 consists essentially of two straight sections with a bend therebetween. This bent tube 42 is attached to the preformed tube 12 so that the plane of its centerline 46 is in the same plane as the centerline 47 of the preformed tube 12. A preferred means for attaching the bent tube 42 is shown in FIG. 3. The end of the bent tube 42 has a V-element 44 which is located so that the plane of the centerline 46 of the bent tube 42 bisects the angle of the V at the notch 48. This ensures that the centerline 47 of the preformed tube 12 will be on the same plane as the centerline 46 of the bent tube 42. The preformed tube 12 is secured against the V-element 44 by means of a screw 56. Arms 52 and 54 form a U which leaves space for the preformed tube 12 and allows the screw 50 to urge the preformed tube 12 against the V-element 44. The screw 50 has a handle 56 which enables the bent tube 42 to be attached to the preformed tube 12 by hand. Since the instrument measures the centerline only of the tube, it is not necessary that bent tube 42 have the same diameter as the preformed tube 12.

Rather than measuring the actual straight section 36 of the preformed tube 12, the attached bent tube 42 is measured so that the straight section 36 appears to have three bends. The straight sections measured on this bent tube 42 may then be used to correlate points when it is necessary to slide the preformed tube 12 on the instrument table 14. If necessary, more than one bent tube 42 may be used as shown in FIG. 1. By taking measurements on the bent tube 42, the spatial relation of the portions of the preformed tube 12 adjacent to the long straight section 36 may be obtained. The simulated bends in the straight section 36 are, of course, omitted in defining the measured tube.

I claim:

1. A method of measuring preformed tubes with long straight sections using an instrument which spatially locates centerline points, comprising:
    attaching each end of a bent tube to the long straight section of a preformed tube, said bent tube having two straight sections defining a bend;
    measuring said bent tube as if it were part of the preformed tube;
    moving said preformed tube so that unmeasured sections of said preformed tube are within the instrument boundaries but leaving sufficient previously measured spatial reference sections within the instrument boundaries to enable the spatial relation of separately measured sections to be determined;
    remeasuring said spatial reference sections;
    repeating the above steps with additional attached bent tubes until the unmeasured sections adjacent the long straight section of the preformed tube are within the instrument boundaries; and
    measuring said adjacent unmeasured sections.

2. The method of claim 1 wherein said bent tube is attached so that the plane of its centerline is the plane of the centerline of the long straight section of said preformed tube.

3. The method of claim 1 wherein said spatial reference sections are the straight sections of said bent tube.

4. In the method of measuring the bends in a preformed tube by locating in space with a mechanical tube-engaging apparatus the centerline of each straight tube section, where the bends are measured of a tube which is longer than the physical boundaries of the apparatus by successively positioning adjacent portions of the tube within the boundaries of the apparatus and repeatedly locating the centerlines of sufficient straight tube sections with the tube in successive positions to correlate the tube position and orientation at the successive tube positions,
    the improvement for measuring a tube with a straight section of such a length that the bends at either end thereof cannot be correlated at successive tube positions within the physical boundaries of said apparatus, comprising:
    attaching at least one tube element with straight sections defining a bend, to the long straight section of said tube;
    repeatedly locating in space the centerline of the bend-defining straight sections of said tube element at successive tube positions with the long straight section of the tube within the physical boundaries of said apparatus to correlate the bends at either end thereof.

5. An apparatus for aiding in measurement of the bends of a preformed tube with a long straight section, comprising:
    a tube element with a bend between two straight sections:
    means for attaching each end of said bent tube element to the long straight section of said preformed tube so that the centerline of the long straight section of said preformed tube lies in the plane of the centerline of said tube element.

6. The apparatus of claim 5 wherein said means for attaching said bent tube element comprises a tube-engaging surface which contains a V-shaped recess and a means for urging the straight section of said preformed tube into the recess of said tube-engaging surface.

* * * * *